US009523338B2

United States Patent
Takizawa et al.

(10) Patent No.: US 9,523,338 B2
(45) Date of Patent: Dec. 20, 2016

(54) CONTROL SYSTEM FOR VEHICLE

(71) Applicant: DENSO CORPORATION, Kariya, Aichi-pref. (JP)

(72) Inventors: Tomohiro Takizawa, Kariya (JP); Hideya Notani, Kariya (JP); Yoshinori Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/709,963

(22) Filed: May 12, 2015

(65) Prior Publication Data
US 2015/0322912 A1    Nov. 12, 2015

(30) Foreign Application Priority Data
May 12, 2014    (JP) .................................. 2014-098501

(51) Int. Cl.
*B60W 30/18*    (2012.01)
*F02N 11/08*    (2006.01)

(52) U.S. Cl.
CPC .......... *F02N 11/0837* (2013.01); *B60W 30/18* (2013.01); *F02N 11/0822* (2013.01); *F02N 11/0833* (2013.01); *F02N 11/0848* (2013.01); *F02N 2200/0801* (2013.01); *F02N 2200/0802* (2013.01); *F02N 2200/102* (2013.01); *F02N 2200/124* (2013.01); *Y02T 10/48* (2013.01)

(58) Field of Classification Search
CPC ..................... F16H 2059/663; B60W 2710/06; B60W 2710/0644; B60W 30/18018; B60W 30/18118; B60W 2550/142; B60W 30/18
See application file for complete search history.

(56) References Cited

U.S. PATENT DOCUMENTS

2002/0103055 A1*    8/2002    Tani ...................... F02D 41/042
                                                                        477/115

FOREIGN PATENT DOCUMENTS

JP            2006-307866 A    11/2006

* cited by examiner

*Primary Examiner* — Huan Le
(74) *Attorney, Agent, or Firm* — Oliff PLC

(57) ABSTRACT

A control system for vehicles equipped with an engine and an automatic transmission mechanism which has a non-running position and a running position one of which is selected by a driver of the vehicle and works to automatically change a speed of an output thereof. The control system basically inhibits the engine from being automatically stopped on an uphill road in order to minimize the rolling back of the vehicle upon start of the vehicle, but is responsive to the driver's intention to permit the engine to be automatically stopped, that is, the switching from the running position to the non-running position to stop the engine.

3 Claims, 4 Drawing Sheets

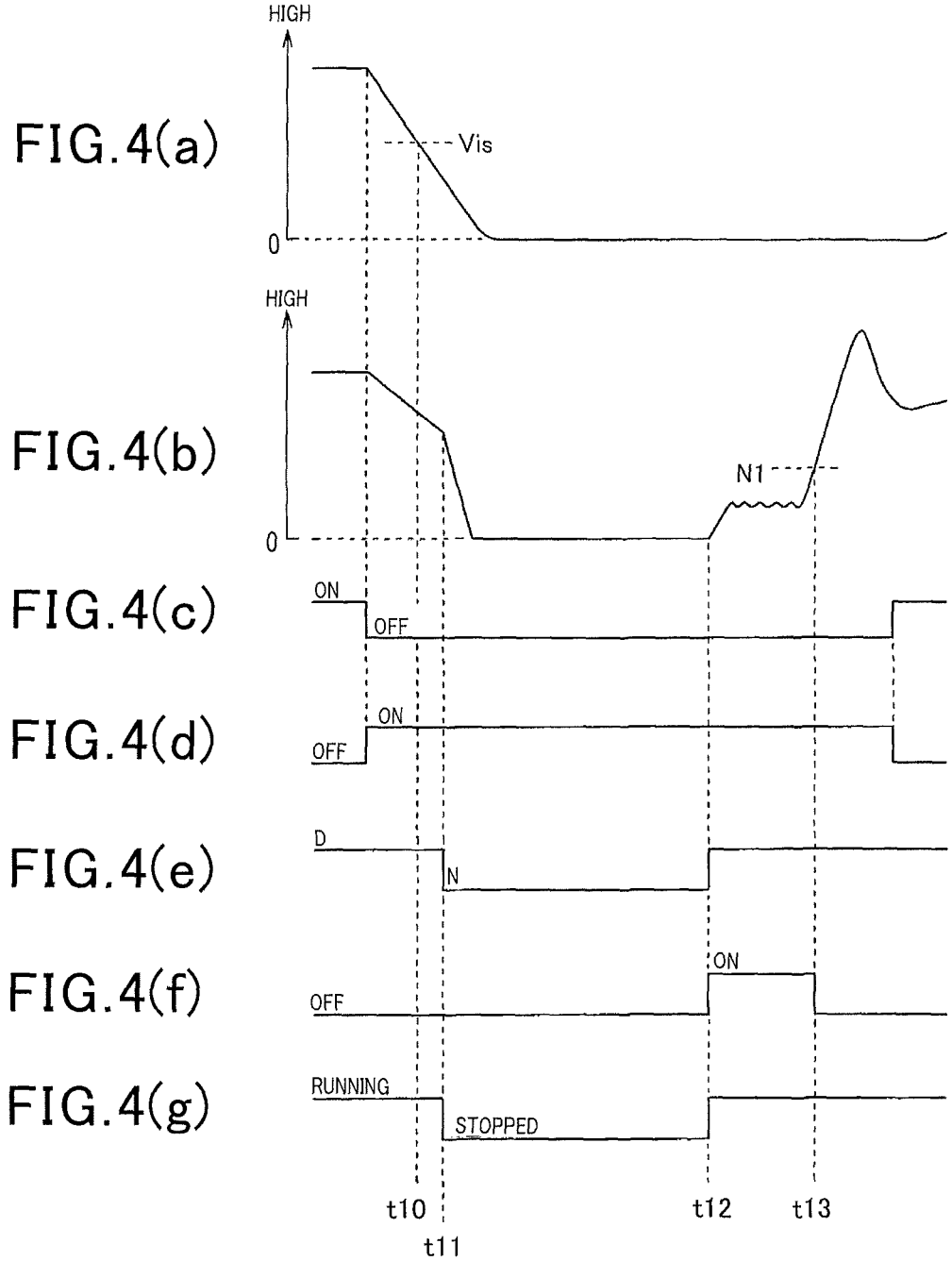

CONTROL SYSTEM FOR VEHICLE

CROSS REFERENCE TO RELATED DOCUMENT

The present application claims the benefit of priority of Japanese Patent Application No. 2014-98501 filed on May 12, 2014, the disclosure of which is incorporated herein by reference.

BACKGROUND OF THE INVENTION

1. Technical Field

This disclosure relates generally to a control system for vehicles, and more particularly to an automatic engine stop control and an automatic engine restart control for vehicles equipped with an automatic transmission.

2. Background Art

Idle-stop systems for automotive vehicles are known which work to automatically stop an engine when given automatic stop conditions are met while the vehicle is in motion or automatically restart the engine when given automatic restart conditions are met after the engine is stopped automatically. Automatic engine stop systems for automotive vehicles are also proposed which are engineered to control an automatic engine stop on an uphill road in view of the fact that when the engine is automatically stopped on the uphill, it may cause the vehicle to roll back following release of a brake upon restart of the engine. For instance, Japanese Patent First Publication No. 2006-307866 teaches an automatic engine stop system which is designed to measure the gradient of a road on which the vehicle is now running and inhibit the engine from being stopped automatically when the gradient of the road is greater than a given value.

The above automatic engine stop system, however, faces the following drawback. The driver of the vehicle may intend to stop the engine when the vehicle is running on the uphill road whose inclination is greater than the given value. In such a case, when the automatic engine stop system inhibits the engine from being stopped, the engine will continue to run against the driver's will. This decreases the number of times the engine is stopped in the idle-stop control mode and, thus, results in a deterioration of saving fuel in the engine.

SUMMARY

It is therefore an object to provide a control system for vehicles which is capable of controlling rolling back of the vehicle when the vehicle has started running and also permitting an engine to be stopped automatically according to an intention of an operator or driver of the vehicle.

According to one aspect of the disclosure, there is provided a control system for a vehicle equipped with an engine such as an internal combustion engine and an automatic transmission mechanism which has a non-running position and a running position one of which is selected by a driver of the vehicle and works to automatically change a speed of an output thereof. The control system comprises: (a) a position determiner which determines which of the non-running positon and the running positon is selected; (b) an uphill road determiner which determines whether the vehicle is on an uphill road or not whose angle of inclination is greater than or equal to a given reference value; and (c) a controller which works to automatically stop the engine when a given automatic stop condition is encountered during running of the engine and also to automatically restart the engine when a given restart condition is met after the engine is automatically stopped.

The controller includes a permission/inhibition determiner which works to inhibit the engine from being automatically stopped when the road on which the vehicle is located is determined by the uphill road determined to be an uphill road whose angle of inclination is greater than or equal to the given reference value, and the running position of the automatic transmission mechanism is determined by the position detector as being selected. The permission/inhibition determiner alternatively permits the engine to be automatically stopped when the road on which the vehicle is located is determined by the uphill road determiner to be the uphill road whose angle of inclination is greater than or equal to the given reference value, and the non-running position of the automatic transmission mechanism is determined by the position detector as being selected.

Control systems are known which inhibit the engine from being automatically stopped for minimizing the rolling back of the vehicle when the angle of inclination of a road on which the vehicle is located is greater than a given angle. This type of systems sometimes do not stop the engine automatically even though the drive has an intention to permit the engine to be stopped automatically. In order alleviate this drawback, the control system of this disclosure is engineered to perceive the driver's intention to permit the engine to be stopped automatically in response to the driver's action to switch between the running positon and the non-running position even when the engine is inhibited from being automatically stopped in the conventional systems since the angle of inclination of the road on which the vehicle is located is greater than the given angle.

Specifically, even when the angle of inclination of the road on which the vehicle is located is greater than the given angle, and thus, the conventional control systems inhibit the engine from being automatically stopped, the control system of this disclosure permits the engine to be automatically stopped in response to the driver's action to switch, for example, a shift lever (also called a selector lever) of the automatic transmission mechanism from the running position to the non-running position. In other words, the control system basically inhibits the engine from being automatically stopped on an uphill road in order to minimize the rolling back of the vehicle upon start of the vehicle, but is responsive to the driver's intention to permit the engine to be automatically stopped, that is, the switching from the running position to the non-running position to stop the engine. The driver's action to select the non-running position is usually useful in transmitting to the controller the driver's intention to stop the engine positively.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 4(a) to 4(g) are views which demonstrate automatic engine start and restart operations of the control system of FIG. 1.

DESCRIPTION OF THE PREFERRED EMBODIMENTS

Figure 1:
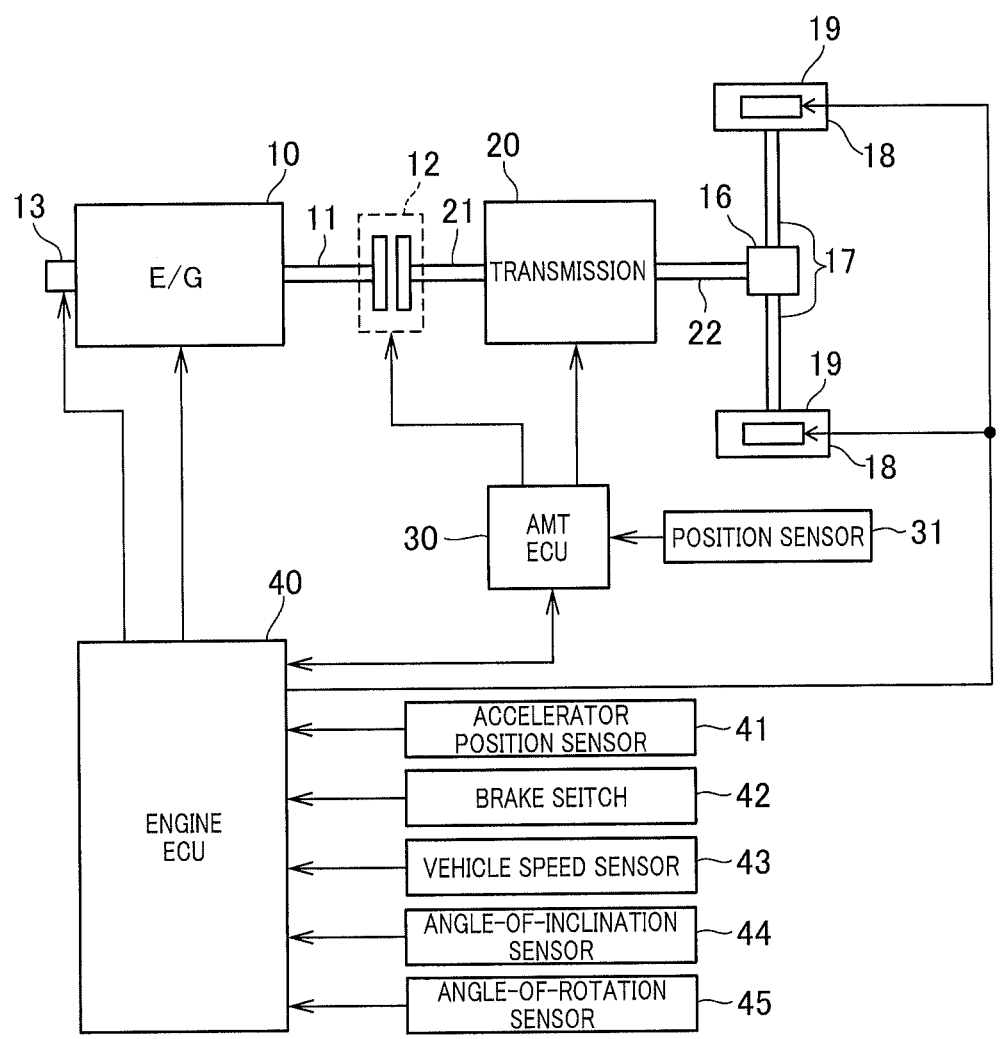
FIG. 1 is a block diagram which illustrates a control system according to an embodiment.

Referring to the drawings, wherein like reference numbers refer to like parts in several views, particularly to FIG. 1, there is shown a control system according to an embodiment which is installed, as an example, in an automotive vehicle equipped with an engine 10 and an automatic transmission 20.

The engine 10 is, for example, a multi-cylinder gasoline engine and equipped with fuel an injector and an igniter for each cylinder (not shown). The automatic transmission 20 is coupled to an output shaft (i.e., a crankshaft) 11 of the engine 10 through a clutch 12 working as a power transmission mechanism. The engine 10 is equipped with a starter 13 which works to apply torque to the engine 10 when it is required to start the engine 10. The engine 10 may alternatively implemented by a diesel engine. A combination of the clutch 12 and the automatic transmission 20 serves as an automatic transmission mechanism.

The clutch 12 is a friction clutch made up of a disc (e.g., a flywheel) joined to the output shaft 11 of the engine 10 and a disc (e.g., a clutch disc) joined to an input shaft 21 of the transmission 20. When the discs are placed in contact with each other, the clutch 12 is engaged (which will also be referred to as a clutch engaged mode below), so that power or torque is transmitted from the engine 10 to the transmission 20. Alternatively, when the discs are placed out of contact with each other, the clutch 12 is disengaged (which will also be referred to as a clutch disengaged mode below), so that the transmission of torque from the engine 10 to the transmission 20 is blocked. The clutch 12 is also equipped with an actuator such as an electric motor to automatically switch between the clutch engaged mode and the clutch disengaged mode.

The transmission 20 works to change the speed of power or torque, as inputted from the engine 10 to the input shaft 21, at a gear ratio automatically selected depending upon the speed of the vehicle, the speed of the engine 10, and the position of a shift lever also called a selector lever (not shown) of the transmission 20 and output it from the output shaft 22. The shift lever is located near the driver's seat of the vehicle and serves as a gear shifting member. The shift lever is manually operated by the driver of the vehicle to select one of, for example, a forward positon (D-position), a reverse position (R-position), and a neutral position (N-position). The D- and R-positions are a gear range (which will also be referred to as a running position below) of the transmission 20 which permits the vehicle to travel. The transmission 20 is equipped with an automatic gear shifting mechanism implemented by an actuator such as an electric motor. In the running position, the transmission 20 works to automatically shift gears through the automatic gear shifting mechanism. Basically, the transmission 20 has the non-running position and the running position one of which is selected by the driver of the vehicle and works to automatically change the speed of an output thereof.

The output shaft 22 of the transmission 20 is connected to driven wheels 18 through a differential gear 16 and a drive shaft 17. Each of the wheels 18 is equipped with a brake actuator 19 which is driven by a brake hydraulic circuit (not shown) to apply a braking force to the wheel 18. The brake actuator 19 is responsive to a change in pressure of brake fluid developed in a master cylinder (not shown) by a driver's effort on a brake pedal to regulate the braking force applied to the wheel 18. The brake hydraulic circuit, as referred to herein, is installed in a brake system which is not equipped with a brake fluid pressure holding mechanism to prevent the vehicle from rolling backward.

The control system also includes an AMT-ECU 30 which is implemented by an electronic control unit to control the engagement or disengagement of the clutch 12 and the switching between gears of the transmission 20. To the AMT-ECU 30, a shift position sensor 31 is connected which detects the position of the shift lever of the transmission 20 (which will also be referred to as a shift position or a selector position below). The shift position sensor 31 outputs a signal indicative of the shift position to the AMT-ECU 30. The AMT-ECU 30 is connected to the engine ECU 40 to transmit control signals or data signals therebetween.

The engine ECU 40 is made of an electronic control unit equipped with a typical microcomputer and works as a controller. The engine ECU 40 analyzes outputs from sensors installed in the control system to perform engine control tasks such as control of the quantity of fuel to be sprayed by a fuel injector mounted in the engine 10 and ignition of fuel by the igniter and also perform an engine starting task to start the engine 10 using the starter 13. Specifically, the sensors joined to the engine ECU 40 include an accelerator position sensor 41, a brake switch 42, a vehicle speed sensor 43, an angle-of-inclination sensor 44, and an angle-of-rotation sensor 45. The accelerator position sensor 41 works to measure the fact that the accelerator pedal has been depressed and the degree to which the accelerator pedal is depressed (i.e., the position of the accelerator pedal). The brake switch 42 works to measure the fact that the brake pedal has been depressed and the degree to which the brake pedal is depressed (i.e., the position of the brake pedal). The vehicle speed sensor 43 works to measure the speed of the vehicle. The angle-of-inclination sensor 44 works to measure a gradient or the degree of inclination of a road on which the vehicle is now present. The angle-of-rotation sensor 45 works to measure the speed of rotation of the engine 10. The outputs of these sensors are inputted to the engine ECU 40. The control system is also equipped with load sensors, such as an airflow meter or an intake air pressure sensor, and a coolant temperature sensor which are not shown. The angle of inclination of the road, as referred to herein, has a positive (+) value indicating the degree of inclination of an uphill road and a negative (−) value indicating the degree of inclination of a downhill road.

The idle-stop control to be performed in the control system of this embodiment will be described below in detail. The control system (i.e., the engine ECU 40) works as a permission/inhibition determiner, as will be described later in detail, which enters an idle-stop mode when given automatic stop conditions or given automatic restart conditions are met. Specifically, when the automatic stop conditions are met, the control system enters an automatic engine stop mode to automatically stop the engine 10. When at least one of given automatic restart conditions is met after the automatic stop of the engine 10, the control system also enters an automatic engine restart mode to resume the injection of fuel into the engine 10 to restart the engine 10. The automatic stop conditions include conditions where the speed of the vehicle has dropped below a stop permissible speed Vis, the brake pedal is depressed, the temperature of coolant of the engine 10 is in a given range, there is no malfunction in an electric charge system, and the battery is operating properly. When these conditions are all met, the control system enters the automatic engine stop mode to stop the engine 10.

The automatic restart conditions include conditions where the brake pedal has been released, that is, a driver's request to restart the engine 10 has been made, the state of charge of the battery installed in the vehicle has dropped below a given charge-requesting level, and an air conditioner installed in the vehicle has been turned on. When at least one of these conditions is satisfied, the control system enters the automatic engine restart mode to restart the engine 10.

In the idle-stop control mode, the control system selectively inhibits the engine 10 from being automatically stopped depending upon the degree of inclination of the road on which the vehicle is present. Specifically, when the angle of inclination of the road, as measured by the angle-of-inclination sensor 44, is below a first reference value A°, the control system permits the engine 10 to be automatically stopped. Alternatively, when the angle of inclination of the road is greater than or equal to the first reference value A°, the control system inhibits the automatic stop of the engine 10. In other words, when the driver of the vehicle is going to stop the vehicle on an uphill road, the control system basically inhibits the engine 10 from being stopped in the idle-stop mode in order to avoid unexpected rolling back of the vehicle when the drivers releases the brake pedal and starts the vehicle. The first reference value A° will also be referred to as a reference angle of inclination below.

The driver of the vehicle sometimes wants to stop the engine 10 even when the control system is inhibiting the engine 10 from being automatically stopped depending upon the angle of inclination of the road of the vehicle. When such a situation is encountered, it is advisable to permit the engine 10 to be stopped in favor of the driver's intention.

In view of the above situation, when the road on which the vehicle is present is an uphill road whose angle of inclination is greater than or equal to the first reference value A°, the control system determines whether the engine 10 should be permitted to be stopped or inhibited from being stopped depending upon the position of the shift lever of the transmission 20. Specifically, when the angle of inclination of the road on which the vehicle is present is greater than or equal to the first reference value A°, and the driver of the vehicle has selected the running position of the transmission 20, the control system works to inhibit the engine 10 from being automatically stopped. Alternatively, when the angle of inclination of the road on which the vehicle is present is greater than or equal to the first reference value A°, and the driver of the vehicle has selected the position of the transmission 20 (which will also be referred to as a non-running position below) other than the running position, the control system works to permit the engine 10 to be automatically stopped. When the engine 10 is permitted to be stopped automatically, the control system perform the automatic stop of the engine 10 when the other engine stop conditions, as described above, are met.

Typical automotive vehicles equipped with an automatic transmission may be rolled backward undesirably on an uphill road when they are started after the engine is stopped. For instance, when an engine restart request is made in a vehicle equipped with an automated manual transmission (AMT) that is one of types of automatic transmissions, the vehicle starts performing a sequence of engine starting tasks to actuate an engine starter, spray fuel into the engine, and ignite the fuel in the engine and then engages the clutch at a given time after, for example, the starter 13 finishes cranking the engine. This is because when the clutch is engaged immediately after the completion of cranking of the engine, it may result in a mechanical shock in the transmission or a lack of torque, as produced by combustion of fuel in the engine, which then leads to stopping of the engine or a failure in starting the vehicle. When the clutch is engaged while the engine is being cranked by the starter 13, it may result in an excessive load on the starter 13, which leads to mechanical damage to the starter 13 or deterioration in operation of the starter 13. In order to avoid the above problems, when it is required to restart the engine in the vehicle equipped with the automated manual transmission, the clutch is engaged after a lapse of a relative long time following the release of the brake pedal by the driver. This, however, result in a concern about undesirable rolling back of the vehicle on a uphill road.

Usually, when the vehicle is parked in the non-running position of the transmission, and the driver has the intention to start the vehicle, the driver first moves the shift lever of the transmission from the non-running position (i.e., the N-position) to the running position (i.e., the D-position). The inventors of this application have focused attention on such a fact and established, as one of the automatic restart conditions, the condition where the position of the transmission 20 has shifted from the non-running position to the running position. This permits a sequence of engine starting tasks to be executed to start the engine 10 when the engine 10 has been stopped in the N-range on an uphill road, and then, the driver has shifted the gear position of the transmission 20 from the N-position to the D-position, in other words, before the brake pedal is released, thereby minimizing the length of time the vehicle rolls backward upon release of the brake pedal after the engine 10 has been permitted to be stopped on an uphill road in the condition where the transmission 20 is in the N-position.

In the case where the engine is stopped in the running position of the transmission on an uphill road, the driver's intention to start the vehicle usually appears as the release of the brake pedal. It is, therefore, impossible to execute the engine starting tasks according to the driver's intention before the release of the brake pedal. The control system of this embodiment is, therefore, engineered to inhibit the engine 10 from being stopped when the vehicle is on the uphill road, and the transmission 20 is in the D-position, thereby avoiding the restart of the engine 10 in a situation where the vehicle will roll backward for a long time.

Figure 2:
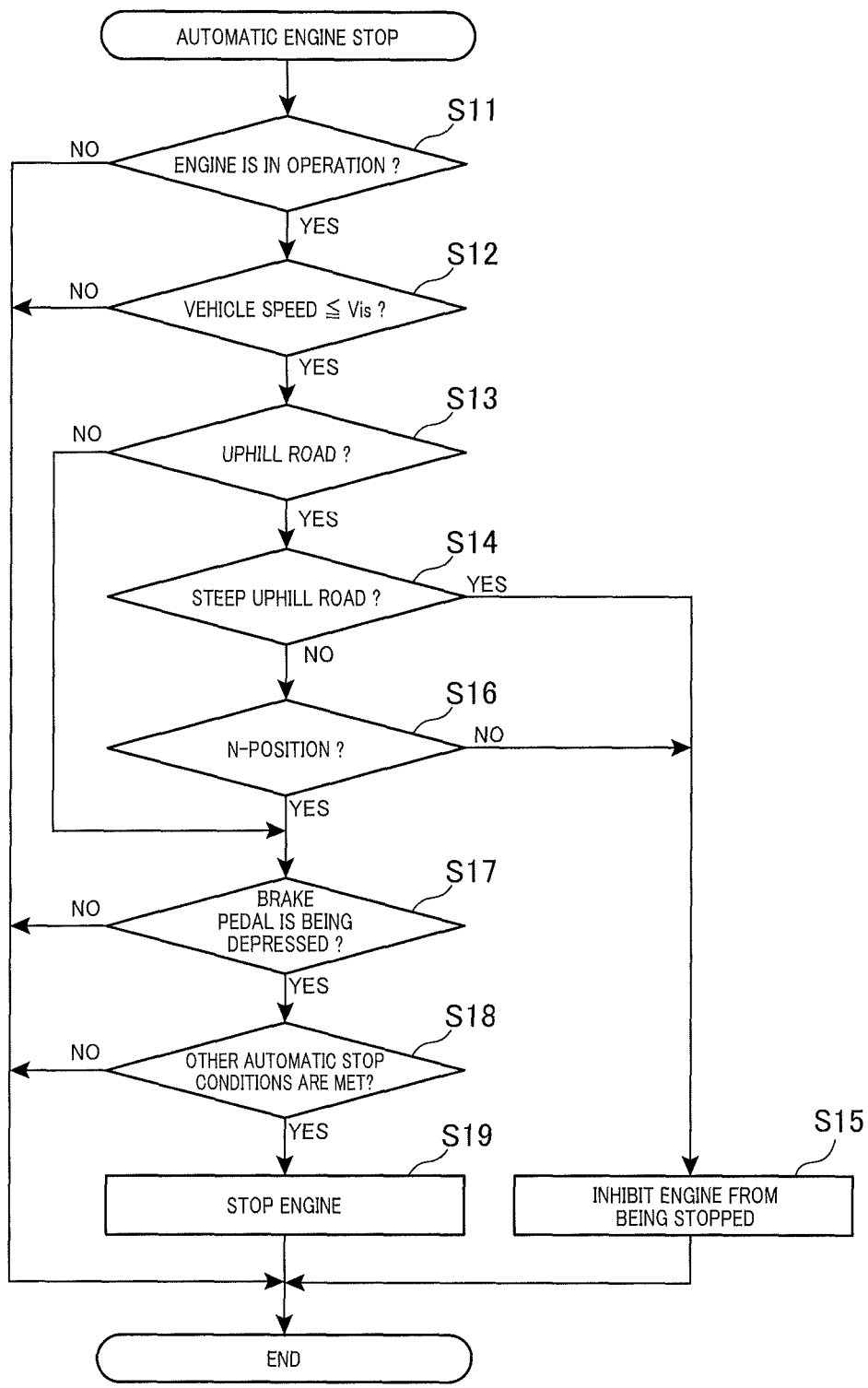
FIG. 2 is a flowchart of an automatic engine stop program to be executed by the control system of FIG. 1.
Figure 3:
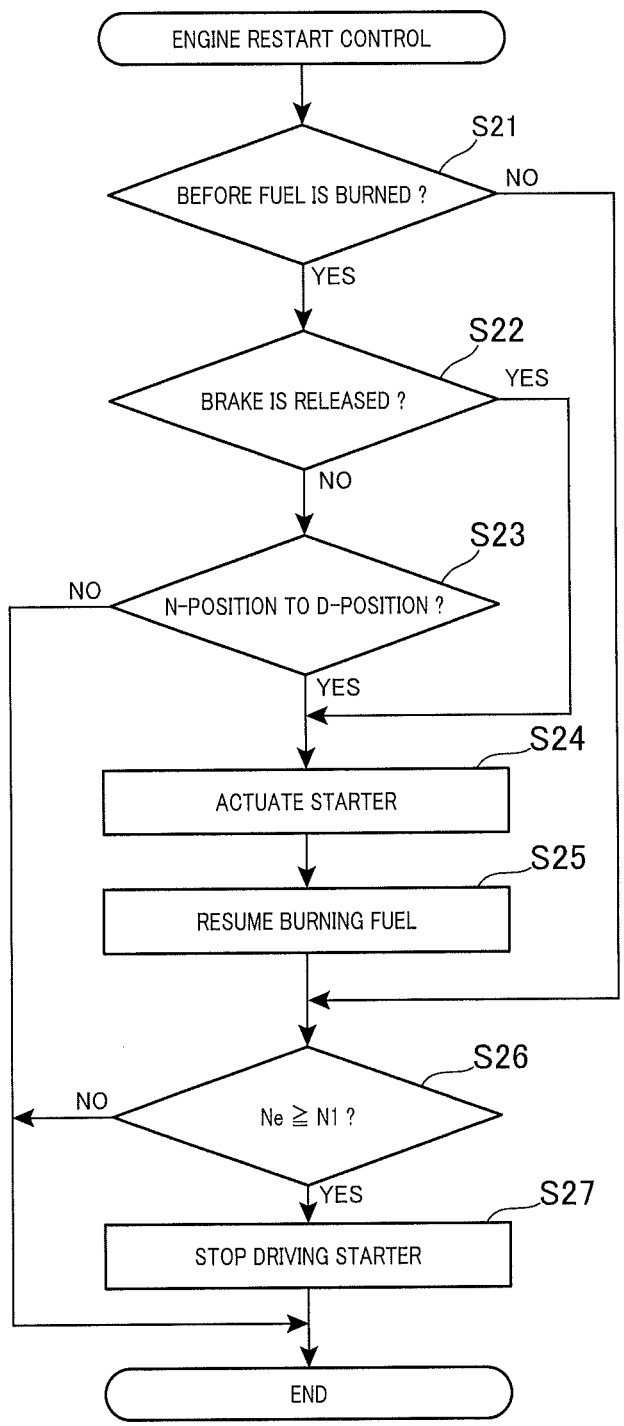
FIG. 3 is a flowchart of an automatic engine restart program to be executed by the control system of FIG. 1.

FIGS. 2 and 3 are flowcharts of sequences of logical steps or programs to perform the idle-stop control. FIG. 2 shows the automatic engine stop program to be executed at given time intervals by the engine ECU 40.

After entering the program, the routine proceeds to step S11 wherein it is determined whether the engine 10 is now running or not. If a YES answer is obtained meaning that the engine 10 is in operation, then the routine proceeds to step S12 wherein it is determined whether the speed of the vehicle, as measured by the vehicle speed sensor 43, is lower than or equal to the stop permissible speed Vis or not. If a YES answer is obtained, then the routine proceeds to step S13 wherein the angle of inclination of the road on which the vehicle is present, as measured by the angle-of-inclination sensor 44, is greater than or equal to the first reference value A° or not. In other words, the engine ECU 40 works as an uphill road determiner to determine whether the road on which the vehicle is now present is an uphill road whose angle of inclination is greater than or equal to the first reference value A° or not.

If a NO answer is obtained in step S13 meaning that the road of the vehicle is not the uphill road whose angle of inclination is greater than or equal to the first reference value A°, then the routine proceeds directly to step S17. In step S17, it is determined whether the brake pedal has been depressed or not by analyzing the output from the brake switch 42. If a YES answer is obtained, then the routine proceeds to step S18 wherein it is determined whether the other automatic stop conditions (i.e., the conditions where the temperature of coolant of the engine 10 is in the given range, the electric charge system is operating properly, and the battery is operating properly) are satisfied or not. If a YES answer is obtained meaning that the above automatic stop conditions for the engine 10 are all met, then the routine proceeds to step S19 wherein the engine ECU 40 cuts a supply of fuel to the engine 10 to stop the engine 10 and also outputs a signal indicating a clutch engagement inhibition request to the AMT-ECU 30 to inhibit the clutch 12 from being engaged.

Alternatively, if a YES answer is obtained in step S13 meaning that the road of the vehicle is the uphill road whose angle of inclination is greater than or equal to the first reference value A°, then the routine proceeds directly to step S14 wherein it is determined whether the road of the vehicle is an uphill road whose angle of inclination is greater than or equal to a given steep angle or not. Specifically, the engine ECU 40 works as a steep angle-of-inclination determiner to determine whether the angle of inclination of the road, as measured by the angle-of-inclination sensor 44, is greater than or equal to a second reference value B° or not. The second reference value B° is greater in angle than the first reference value A°.

If a YES answer is obtained in step S14 meaning that the vehicle is now located on a steep uphill road, then the routine proceeds to step S 15 wherein the engine ECU 40 is inhibited from automatically stopping the engine 10 and keeps the engine 10 operating. Alternatively, if a NO answer is obtained meaning that the road of the vehicle is not a steep uphill road whose angle of inclination is greater than or equal to the second reference value B°, then the routine proceeds to step S16 wherein it is determined whether the positon of the shift lever of the transmission 20 (i.e., the gear position of the transmission 20), as measured by the shift position sensor 31, is in the N-position or not. Specifically, the engine ECU 40 works as a position determiner to receive information about the gear position of the transmission 20, as given by the output of the shift position sensor 31 through the AMT-ECU 30, and analyze the information to determine whether the shift lever of the transmission 20 is in the N-positon or not.

If the position of the shift lever of the transmission 20 is in the D-position, a NO answer is obtained in step S16. The routine then proceeds to step S15 to keep the engine 10 operating. Alternatively, if a YES answer is obtained in step S16 meaning that the position of the transmission 20 is in the N-position, then the routine proceeds to step S17 wherein it is determined whether the brake pedal is being depressed or not, that is, whether the vehicle is being braked or not. If a YES answer is obtained, then the routine proceeds to step S18 wherein the other automatic stop conditions, as described above, are met or not. If a YES answer is obtained, then the routine proceeds to step S19 wherein the engine ECU 40 cuts supply of fuel to the engine 10 to stop it. The engine ECU 40 also outputs a clutch engagement inhibition request to the AMT-ECU 30 to inhibit the clutch 12 from being engaged.

FIG. 3 shows the automatic engine restart program to be executed at given time intervals by the engine ECU 40 after the engine 10 is automatically stopped.

After entering the program, the routine proceeds to step S21 wherein it is determined whether the engine 10 has not yet resumed burning the fuel or not. If a YES answer is obtained, then the routine proceeds to step S22 wherein the output from the brake switch 42 is analyzed to determine whether the brake pedal is released or not. If a NO answer is obtained meaning that the brake is still being applied to the vehicle, then the routine proceeds to step S23 wherein the output from the shift position sensor 31 is analyzed to determine whether the position of the shift lever of the transmission 20 has been switched from the N-position to the D-position or not while the engine 10 is at rest.

If a NO answer is obtained in step S23 meaning that the gear position of the transmission 20 is not changed while the engine 10 is at rest, then the routine terminates. Alternatively, if a YES answer is obtained, then the routine proceeds to step S24 wherein the starter 13 is activated to start cranking the engine 10. The routine then proceeds to step S24 wherein the fuel starts being sprayed into the engine 10 to resume burning the fuel. The routine proceeds to step S26 wherein the speed of the engine 10, as measured by the angle-of-rotation sensor 45, has exceeded a cranking stop reference value N1 or not. The cranking stop reference value N1 is set lower than an idling speed of the engine 10, for example, about 500 rpm.

If a YES answer is obtained in step S26 meaning that the speed of rotation of the engine 10 is higher than the cranking stop reference value N1, then the routine proceeds to step S27 wherein the starter 13 is turned off. Afterwards, the engine ECU 40 withdraws the clutch the clutch engagement inhibition request from the AMT-ECU 30 to permit the clutch 12 to be engaged. Specifically, when an operating range of the engine 10 where a required degree of engine torque is produced is entered, the engine ECU 40 withdraws the clutch engagement inhibition request and then executes another engine operating program (not shown).

The idle stop control executed by the control system of this embodiment will be described below with reference to FIGS. 4(a) to 4(g). FIG. 4(a) indicates a change in speed of the vehicle with time.

FIG. 4(b) indicates a change in speed of the engine 10 with time. FIG. 4(c) indicates depression or release of the accelerator pedal. "ON" represents the fact that the accelerator pedal is depressed, while "OFF" represents the fact that the accelerator pedal is released. FIG. 4(e) indicates a change in gear position of the transmission 20 (i.e., the position of the shift lever). FIG. 4(f) indicates an on- or off-state of the starter 13. FIG. 4(g) indicates running or stopping of the engine 10. FIGS. 4(a) to 4(g) demonstrate an example in which the vehicle is on an uphill road whose angle of inclination is greater than or equal to the first reference value A° and lower than the second reference value B°.

When the driver depresses the brake pedal to decelerate the vehicle during running of the vehicle, so that the speed of the vehicle drops below the stop permissible speed Vis, the engine 10 is not stopped, that is, the engine 10 continues to run at time t10. Afterwards, when the driver changes the positon of the shift lever of the transmission 20 from the D-position to the N-position at time t11, the engine ECU 40 cuts the supply of fuel to the engine 10 and stops igniting the fuel in the engine 10.

When, after the engine 10 is stopped, the driver changes the position of the shift lever of the transmission 20 from the N-position to the D-position to start the vehicle while depressing the brake pedal at time t12, the engine ECU 40 is responsive to the change from the N-position to the D-position to actuate the starter 13 to crank the engine 10. When the engine 10 has started firing, so that the speed of the engine 10 exceeds the cranking stop reference value N1 at time t13, the engine ECU 40 stop driving the starter 13. After the start-up of the engine 10, the AMT-ECU 30 engages the clutch 12. This causes the clutch 12 to be already placed in the engaged state when the driver releases the brake pedal or minimizes the length of time between the release of the brake pedal and the completion of engagement of the clutch 12, thereby avoiding the rolling back of the vehicle.

In the case where the positon of the shift lever of the transmission 20 is changed from the D-position to the N-position before time t10 when the speed of the vehicle drops below the stop permissible speed Vis, the engine ECU 40 cuts the supply of fuel to the engine 10 to stop it.

The above embodiment offers the following advantages.

When the vehicle is on an uphill road upon detection of the driver's action to stop the vehicle, the conventional control systems, as described in the introductory part of this application, inhibit the engine 10 from being stopped. The engine ECU 40 is, however, responsive to changing of the shift position of the transmission 20 from the running positon to the non-running position to permit the engine 10 to be stopped. Basically, the engine ECU 40 inhibits the engine 10 from being stopped when the vehicle is on the uphill road for avoiding the rolling back of the vehicle when restarted. However, when having an intention to place the engine 10 in the automatic engine stop mode, the driver can move the shift lever of the transmission 20 to the non-running position (e.g., the N-position) to stop the engine 100 automatically. The driver's action to change the position of the shift lever to the non-running position is usually useful in transmitting, to the engine ECU 40, the driver's intention to stop the engine 10 positively.

The automatic restart conditions, as described above, include the condition where the position of the shift lever of the transmission 20 has been changed from the non-running positon to the running position. Usually, when having an intention to start the vehicle while the vehicle is at rest in the non-running position, the driver first changes the shift lever from the non-running position to the running position. In view of this fact, the control system is designed to include, as one of the automatic restart conditions, the condition where the position of the shift lever of the transmission 20 has been changed from the non-running positon to the running position. This causes the control system to start executing the sequence of engine starting tasks to restart the engine 10 when the engine 10 has been stopped in the non-running position of the transmission 20 on an uphill road, after which the driver has changed the shift lever from the non-running positon to the running position. This avoids or minimizes the rolling back of the vehicle upon start of the vehicle after the engine 10 has been permitted to be stopped in the condition where the non-running position is selected.

After the engine 10 is stopped, and the vehicle is also stopped with the shift lever of the transmission 20 being kept in the running position, the driver's intention to start the vehicle usually appears as the release of the brake pedal. It is, therefore, impossible to start the engine 10 according to the driver's intention before the release of the brake pedal. In view of this fact, the control system of this embodiment is designed to inhibit the engine 10 from being stopped as long as the running position of the transmission 20 is selected on an uphill road, thereby preventing the engine 10 from being restarted in a situation where a period of time for which the vehicle rolls backward would be long.

When the angle of inclination of the surface of a road on which the vehicle is located, as measured by the angle-of-inclination sensor 44, is greater than or equal to the second reference value B°, the control system works to inhibit the engine 10 from being automatically stopped regardless of whether the shift lever of the transmission 20 is in the running positon or in the non-running position. Usually, the vehicle would be rolled backward between the release of the brake pedal made by the driver and the engagement of the clutch 12. The greater the angle of inclination of a road on which the vehicle is located, the more the vehicle rolls back.

In view of this fact, the control system is designed to inhibit the engine 10 from being automatically stopped in a situation where the vehicle would roll back greatly. This permits the automatic engine stop/restart control to be performed in safety.

Some vehicles in which the automatic transmission has no torque converter do not creep. When this type of vehicle is started by the driver on an uphill road while the vehicle and the engine are at rest, the vehicle would roll back greatly. The control system is very useful for such a type of vehicle and works to minimize the rolling back of the vehicle without sacrificing the driver's intention.

The control system is installed in the vehicle which is not equipped with the brake fluid pressure holding mechanism in the brake hydraulic circuit. This meets the demand to reduce the overall production costs of the vehicle.

Modifications

While the present invention has been disclosed in terms of the preferred embodiment in order to facilitate better understanding thereof, it should be appreciated that the invention can be embodied in various ways without departing from the principle of the invention.

The control system, as described above, inhibits the engine 10 from being stopped regardless of the position of the shift lever of the transmission 20 when it is determined that the road on which the vehicle is located is an uphill road whose angle of inclination is greater than or equal to the given steep angle, however, may alternatively be designed to permit the engine 10 from being automatically stopped when the shift lever is in the N-position. Specifically, if a YES answer is obtained in step S13 of FIG. 2 meaning that the angle of inclination of the road on which the vehicle is present, as measured by the angle-of-inclination sensor 44, is greater than or equal to the first reference value A°, the routine proceeds directly to step S16 without performing the operation of step S14. If YES answers are obtained in steps S16, S17, and S18, the routine proceeds to step S 19 wherein the engine ECU 40 stop the engine 10. This realizes the idle-stop control in more favor of the driver's intention to stop the engine 10.

Instead of use of the output from the brake switch to determine whether the brake pedal is depressed or not as one of the automatic stop conditions, the pressure of brake fluid (e.g., the pressure in the master cylinder) may be used. Specifically, the engine ECU 40 measures the pressure of the brake fluid using, for example, a pressure sensor and determines whether the measured pressure lies within an engine stop permissible range or not which permits the brake pedal to be determined to be depressed. When the pressure is determined to be in the engine stop permissible range, the engine ECU 40 permits the engine 10 from being stopped. Afterwards, when the pressure falls out of the engine stop permissible range after the engine 10 is stopped automatically, the engine ECU 40 permits the engine 10 to be restarted.

The example where the control system is used with the vehicle which is not equipped with the brake fluid pressure holding mechanism in the brake hydraulic circuit has been referred to above, however, the control system may alternatively be employed in vehicle equipped with the brake fluid pressure holding mechanism.

The transmission 20 has the forward positon (D-position), the reverse position (R-position), and the neutral position (N-position), however, it may be designed to have an additional gear position such as a parking position (P-position). In this case, the non-running positon includes the N-positon and the P-position. Accordingly, when the road on which the vehicle is located is an uphill road whose angle of inclination is greater than or equal to the first reference value A°, and the shift lever of the transmission 20 is either in the N-position or in the P-position, the engine ECU 40 permits the engine 10 to be stopped automatically. When the driver has changed the shift lever from the P-position to the D-position after the engine 10 is stopped in the P-position, the engine ECU 40 restarts the engine 10.

The control system is employed with the vehicle equipped with the automatic power transmission device (implemented by an automated manual transmission) including the frictional clutch 12 and a speed variator (i.e., the transmission 20), however, may alternatively be used with a dual clutch transmission equipped with two frictional clutches, an automatic transmission (AT) also called a self-shifting gearbox equipped with a torque converter, or a continuously variable transmission (CVT) also called a gearless transmission.

What is claimed is:

1. A control system for a vehicle equipped with an engine and an automatic transmission mechanism, the automatic transmission mechanism having a non-running position and a running position, a driver of the vehicle selecting between the non-running position and the running position, the automatic transmission mechanism automatically changing a speed of an output of the automatic transmission mechanism, the control system comprising:
    a position determiner which determines which of the non-running position and the running position of the automatic transmission mechanism is selected by the driver of the vehicle through a shift lever;
    an uphill road determiner which determines whether the vehicle is on an uphill road having an angle of inclination that is greater than or equal to a given reference value; and
    a controller which automatically stops the engine when a given automatic stop condition is encountered during running of the engine and also automatically restarts the engine when a given restart condition is met after the engine has been automatically stopped, the controller including a permission/inhibition determiner which inhibits the engine from being automatically stopped when (1) a road on which the vehicle is located is determined by the uphill road determiner to be the uphill road having the angle of inclination that is greater than or equal to the given reference value, and (2) the position determiner determines that the running position of the automatic transmission mechanism is selected, the permission/inhibition determiner alternatively permitting the engine to be automatically stopped when (i) the road on which the vehicle is located is determined by the uphill road determiner to be the uphill road having the angle of inclination that is greater than or equal to the given reference value, and (ii) the position determiner determines that the non-running position of the automatic transmission mechanism is selected.

2. The control system as set forth in claim 1, wherein when the non-running position is changed to the running position when the permission/inhibition determiner has been permitting the engine to he automatically stopped, the controller automatically restarts the engine while the driver is determined to be applying a brake to the vehicle and before the brake is released by the driver.

3. A control system for a vehicle equipped with an engine and an automatic transmission mechanism, the automatic transmission mechanism having a non-running position and a running position, a driver of the vehicle selecting between the non-running position and the running position, the automatic transmission mechanism automatically changing a speed of an output of the automatic transmission mechanism, the control system comprising:
    a position determiner which determines which of the non-running position and the running position is selected;
    an uphill road determiner which determines whether the vehicle is on an uphill road having an angle of inclination that is greater than or equal to a given reference value; and
    a controller which automatically stops the engine when a given automatic stop condition is encountered during running of the engine and also automatically restarts the engine when a given restart condition is met after the engine has been automatically stopped, the controller including a permission/inhibition determiner which inhibits the engine from being automatically stopped when (1) a road on which the vehicle is located is determined by the uphill road determiner to be the uphill road having the angle of inclination that is greater than or equal to the given reference value, and (2) the position determiner determines that the running position of the automatic transmission mechanism is selected, the permission/inhibition determiner alternatively permitting the engine to be automatically stopped when (i) the road on which the vehicle is located is determined by the uphill road determiner to be the uphill road having the angle of inclination that is greater than or equal to the given reference value, and (ii) the position determiner determines that the non-running position of the automatic transmission mechanism is selected,
    wherein the controller includes a steep angle-of-inclination determiner which determines whether the road on which the vehicle is present is a steep uphill road having the angle of inclination that is greater than or equal to a second reference value, which is greater than the given reference value, and
    wherein when the road on which the vehicle is present is determined to be the steep uphill road having the angle of inclination that is greater than or equal to the second reference value, the permission/inhibition determiner inhibits the engine from being automatically stopped, regardless of whether the automatic transmission mechanism is in the running position or in the non-running position.

* * * * *